US008082063B2

(12) United States Patent
Sekiya (10) Patent No.: US 8,082,063 B2
(45) Date of Patent: *Dec. 20, 2011

(54) MOBILE APPARATUS AND MOBILE APPARATUS SYSTEM

(75) Inventor: Makoto Sekiya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 12/323,862

(22) Filed: Nov. 26, 2008

(65) Prior Publication Data

US 2009/0143931 A1  Jun. 4, 2009

(30) Foreign Application Priority Data

Nov. 30, 2007  (JP) ................................ 2007-311478

(51) Int. Cl.
*G05B 19/04* (2006.01)
(52) U.S. Cl. .......... 700/255; 700/90; 700/245; 700/248; 700/250; 700/253; 701/301; 701/302; 706/14; 706/45; 706/46; 901/1; 901/46; 901/50
(58) Field of Classification Search .................... 700/90, 700/245, 248, 250, 253, 255; 701/301, 302
See application file for complete search history.

(56) References Cited

U.S. PATENT DOCUMENTS

| 7,474,945 | B2 * | 1/2009 | Matsunaga ..................... 701/25 |
| 7,769,491 | B2 * | 8/2010 | Fukuchi et al. ................ 700/253 |
| 2005/0216181 | A1 * | 9/2005 | Estkowski et al. ............ 701/200 |
| 2006/0095160 | A1 * | 5/2006 | Orita et al. .................... 700/248 |
| 2006/0106496 | A1 * | 5/2006 | Okamoto ....................... 700/253 |
| 2007/0027579 | A1 * | 2/2007 | Suzuki et al. ................. 700/245 |
| 2007/0198128 | A1 * | 8/2007 | Ziegler et al. ................ 700/245 |
| 2007/0282531 | A1 * | 12/2007 | Park et al. .................... 701/301 |
| 2008/0033649 | A1 * | 2/2008 | Hasegawa et al. ........... 701/301 |
| 2008/0040040 | A1 * | 2/2008 | Goto et al. .................... 701/301 |
| 2008/0249662 | A1 * | 10/2008 | Nakamura ..................... 700/253 |

FOREIGN PATENT DOCUMENTS

JP  2006-133863  5/2006

* cited by examiner

*Primary Examiner* — Thomas Black
*Assistant Examiner* — Shardul Patel
(74) *Attorney, Agent, or Firm* — Rankin, Hill & Clark LLP (57) ABSTRACT

Mobile apparatuses capable of moving or acting autonomously, without contacting each other, in an environment where movements of the mobile apparatuses are not managed by a server, are provided. In a robot functioning as a first mobile apparatus, it is recognized that an object corresponds to a second mobile apparatus, and based on this recognition, a target trajectory is searched for and determined. Further, the first mobile apparatus causes another robot functioning as the second mobile apparatus to recognize a part or a whole of the target trajectory. In the second mobile apparatus, the part or the whole of the target trajectory of the first mobile apparatus is recognized, and based on this recognition, a target trajectory that the second mobile apparatus should follow is searched for and determined. This allows the mobile apparatuses to move along their respective target trajectories to avoid contact with each other.

9 Claims, 9 Drawing Sheets

MOBILE APPARATUS AND MOBILE APPARATUS SYSTEM

BACKGROUND OF THE INVENTION

1. Field of the Invention

The present invention relates to an apparatus which moves autonomously.

2. Description of the Related Art

As robots have become more sophisticated in functionality, there are increasing opportunities for the robots to perform jobs or works such as carrying luggage or guiding human beings to their destinations. As such, in the environment where a plurality of robots coexist, the need for each robot to move while preventing collision with the other robots is increasing. In this relation, a technique to manage movements of a plurality of robots by a server to avoid contact therebetween is proposed (see Japanese Patent Application Laid-Open No. 2006-133863).

In the environment where the movements of the robots are not managed by the server, however, the robots are required to act or move autonomously while avoiding contact with each other. Even in the case where the movements of the robots are managed by the server, if the robots are out of the communication range of the server, the need for the robots to act or move autonomously while preventing contact with each other arises. On the other hand, in the case where the robots are similar or identical in algorithm for autonomous motion to each other, the robots may act in a similar manner to avoid contact with the other robots. This may rather increase the possibility of contact therebetween despite their movements for the purposes of avoiding the contact.

SUMMARY OF THE INVENTION

In view of the foregoing, an object of the present invention is to primarily provide mobile apparatuses capable of moving or acting autonomously, while preventing contact with each other, in the environment where the movements of the mobile apparatuses are not managed by a server.

A mobile apparatus system according to a first invention is made up of a first mobile apparatus and a second mobile apparatus each including a control device and having its operation controlled by the control device to autonomously move along a target trajectory representing changes in a target position defined in a two-dimensional model space. The control device includes a first processing unit, a second processing unit, and a third processing unit, wherein in the i-th mobile apparatus (i=1, 2), the first processing unit recognizes the i-th mobile apparatus and a trajectory representing changes in position of the i-th mobile apparatus as a first spatial element and a first trajectory representing changes in a first position, respectively, in the model space, recognizes an object and a trajectory representing changes in position of the object as a second spatial element and a second trajectory representing changes in a second position, respectively, and recognizes the second spatial element continuously or intermittently expanded in accordance with the second trajectory as an expanded second spatial element, the second processing unit determines whether a safety condition is satisfied based on the recognition result by the first processing unit, the safety condition specifying that the possibility of contact between the first spatial element and the second spatial element is low, and on the condition that the second processing unit determines that the safety condition is not satisfied, the third processing unit searches for the target trajectory based on the recognition result by the first processing unit, the target trajectory allowing the first spatial element to avoid contact with the expanded second spatial element, wherein in the first mobile apparatus, the control device causes the second mobile apparatus to recognize a part or a whole of the target trajectory searched for and determined by the third processing unit, and wherein in the second mobile apparatus, the control device recognizes the part or the whole of the target trajectory of the first mobile apparatus, and based on this recognition result, the first processing unit recognizes the trajectory of the first mobile apparatus as the second trajectory, with the first mobile apparatus regarded as the object.

According to the mobile apparatus system of the first invention, in the case where the safety condition is not satisfied in a respective one of the first and second mobile apparatuses, i.e., in the case where there is a high possibility that the mobile apparatus comes into contact with an object, a target trajectory allowing the first spatial element to avoid contact with the expanded second spatial element in the model space is searched for and determined. With the mobile apparatus autonomously moving along this target trajectory, the contact between the mobile apparatus and the object is avoided.

Further, a part or a whole of the target trajectory of the first mobile apparatus is recognized by the second mobile apparatus. Then, in the second mobile apparatus, based on this recognition result, the trajectory of the first mobile apparatus which is regarded as the object is recognized as the second trajectory, and the expanded second spatial element is recognized based on this second trajectory. Accordingly, in the second mobile apparatus, the target trajectory allowing the first spatial element to avoid contact with the expanded second spatial element in the model space is searched for and determined, as described above, and with the second mobile apparatus autonomously moving along this target trajectory, the contact between the first mobile apparatus and the second mobile apparatus is avoided. In this manner, the mobile apparatuses are capable of moving or acting autonomously, while preventing contact with each other, in the environment where the movements of the mobile apparatuses are not managed by a server.

A mobile apparatus system according to a second invention is characterized in that, in the mobile apparatus system of the first invention, in the first mobile apparatus, the second processing unit determines whether an additional safety condition is satisfied, the additional safety condition specifying that the object does not correspond to the second mobile apparatus, and in the case where the second processing unit determines that the additional safety condition is satisfied, the third processing unit searches for a first target trajectory as the target trajectory, whereas in the case where the second processing unit determines that the additional safety condition is not satisfied, the third processing unit searches for a second target trajectory different from the first target trajectory as the target trajectory.

According to the mobile apparatus system of the second invention, in the first mobile apparatus, with the additional safety condition specifying that the object does not correspond to the second mobile apparatus, the first target trajectory which is searched for in the case where it is determined that the additional safety condition is satisfied and the second target trajectory which is searched for in the case where it is determined that the additional safety condition is not satisfied are differentiated from each other. This allows the first mobile apparatus to autonomously move along the different target trajectories according to whether the object corresponds to the second mobile apparatus. Accordingly, it is possible to prevent the undesirable situation that, because the first and second mobile apparatuses are identical or similar in algorithm for searching for the target trajectories, the possibility of contact therebetween would not lower, or rather increase, when they move along the target trajectories for the purposes of preventing the contact. Furthermore, it is possible to cause the second mobile apparatus to recognize a part or a whole of the target trajectory of the first mobile apparatus, and based on this recognition result, to recognize the trajectory of the first mobile apparatus as the object, and further to recognize the expanded second spatial element based on that recognition result. Accordingly, in the second mobile apparatus, the target trajectory for the first spatial element to avoid contact with the expanded second spatial element is searched for and determined, and with the second mobile apparatus autonomously moving along this target trajectory, the contact between the first and second mobile apparatuses is prevented. In this manner, the mobile apparatuses are capable of moving or acting autonomously, while preventing contact therebetween, in the environment where the movements of the mobile apparatuses are not managed by a server.

A mobile apparatus system according to a third invention is characterized in that, in the mobile apparatus system of the second invention, in the first mobile apparatus, the third processing unit searches for the second target trajectory such that the first spatial element following the second target trajectory has a velocity of 0 or lower than the velocity of the first spatial element following the first target trajectory.

According to the mobile apparatus system of the third invention, in the case where the object corresponds to the second mobile apparatus, the first mobile apparatus autonomously moves such that its velocity becomes 0 or lower than in the case where the object does not correspond to the second mobile apparatus. This can prevent the undesirable situation that, because the first and second mobile apparatuses are identical or similar in algorithm for searching for the target trajectories, the possibility of contact therebetween would not lower, or rather increase, when they move along the target trajectories for the purposes of preventing the contact. Accordingly, the mobile apparatuses are capable of moving or acting autonomously, while preventing contact therebetween, in the environment where the movements of the mobile apparatuses are not managed by a server.

A mobile apparatus system according to a fourth invention is characterized in that, in the mobile apparatus system of the second invention, in the first mobile apparatus, the third processing unit searches for the second target trajectory such that the second target trajectory is on an opposite side of the expanded second spatial element from the first target trajectory in the element passing region.

According to the mobile apparatus system of the fourth invention, when the object corresponds to the second mobile apparatus, the first mobile apparatus autonomously moves to the opposite side of the second mobile apparatus from when the object does not correspond to the second mobile apparatus. This can prevent the undesirable situation that, because the first and second mobile apparatuses are identical or similar in algorithm for searching for the target trajectories, the possibility of contact therebetween would not lower, or rather increase, when they move along the target trajectories for the purposes of preventing the contact. Accordingly, the mobile apparatuses are capable of moving or acting autonomously, while preventing contact therebetween, in the environment where the movements of the mobile apparatuses are not managed by a server.

A mobile apparatus system according to a fifth invention is characterized in that, in the mobile apparatus system of the second invention, in the first mobile apparatus, on the condition that the second processing unit determines that the additional safety condition is not satisfied, the control device causes the second mobile apparatus to recognize a part or a whole of the target trajectory searched for and determined by the third processing unit.

According to the mobile apparatus system of the fifth invention, in the case where it is determined in the first mobile apparatus that the object corresponds to the second mobile apparatus, the first mobile apparatus is capable of causing the second mobile apparatus to recognize a part or a whole of the second target trajectory that is searched for and determined as the target trajectory in the first mobile apparatus. This allows the second mobile apparatus to search for an appropriate target trajectory for preventing contact with the first mobile apparatus, taking account of the manner of movement of the first mobile apparatus along the second target trajectory. Accordingly, the mobile apparatuses are capable of moving or acting autonomously, while preventing contact therebetween, in the environment where the movements of the mobile apparatuses are not managed by a server.

A mobile apparatus system according to a sixth invention is characterized in that, in the mobile apparatus system of the first invention, in the first mobile apparatus, the control device transmits a trajectory signal representing a part or a whole of the target trajectory to the second mobile apparatus, and in the second mobile apparatus, the control device receives the trajectory signal to recognize the part or the whole of the target trajectory.

According to the mobile apparatus system of the sixth invention, it is possible to cause the second mobile apparatus to recognize a part or a whole of the target trajectory that the first mobile apparatus follows, through the communication between the first and second mobile apparatuses, and based thereon, to further cause the second mobile apparatus to recognize the second trajectory and the expanded second spatial element. This can prompt the second mobile apparatus to search for and determine the target trajectory which allows it to avoid contact with the first mobile apparatus, and to move in accordance with this target trajectory.

A mobile apparatus system according to a seventh invention is characterized in that, in the mobile apparatus system of the first invention, in the first mobile apparatus, the control device controls the operation of the first mobile apparatus to express a part or a whole of the target trajectory, and in the second mobile apparatus, the control device recognizes the operation of the first mobile apparatus to recognize the part or the whole of the target trajectory expressed by the operation.

According to the mobile apparatus system of the seventh invention, it is possible to cause the second mobile apparatus to recognize a part or a whole of the target trajectory that the first mobile apparatus follows, through the operation of the first mobile apparatus, and based thereon, to further cause the second mobile apparatus to recognize the second trajectory and the expanded second spatial element. This can prompt the second mobile apparatus to search for and determine the target trajectory which allows it to avoid contact with the first mobile apparatus, and move in accordance with this target trajectory.

A mobile apparatus according to an eighth invention is characterized in that it corresponds to the first mobile apparatus as a component of the mobile apparatus system of the first invention.

According to the mobile apparatus (first mobile apparatus) of the eighth invention, it is possible to cause another mobile apparatus (second mobile apparatus) to recognize a part or a whole of the target trajectory of the first mobile apparatus. This can prompt the second mobile apparatus to move while avoiding contact with the first mobile apparatus (as the object) in the environment where the movements of the mobile apparatuses are not managed by a server.

A mobile apparatus according to a ninth invention is characterized in that it corresponds to the second mobile apparatus as a component of the mobile apparatus system of the first invention.

According to the mobile apparatus (second mobile apparatus) of the ninth invention, it is possible to recognize a part or a whole of the target trajectory of another mobile apparatus (first mobile apparatus). Accordingly, the second mobile apparatus is capable of moving while avoiding contact with the first mobile apparatus (as the object) in the environment where the movements of the mobile apparatuses are not managed by a server.

DESCRIPTION OF THE PREFERRED EMBODIMENTS

Figure 1:
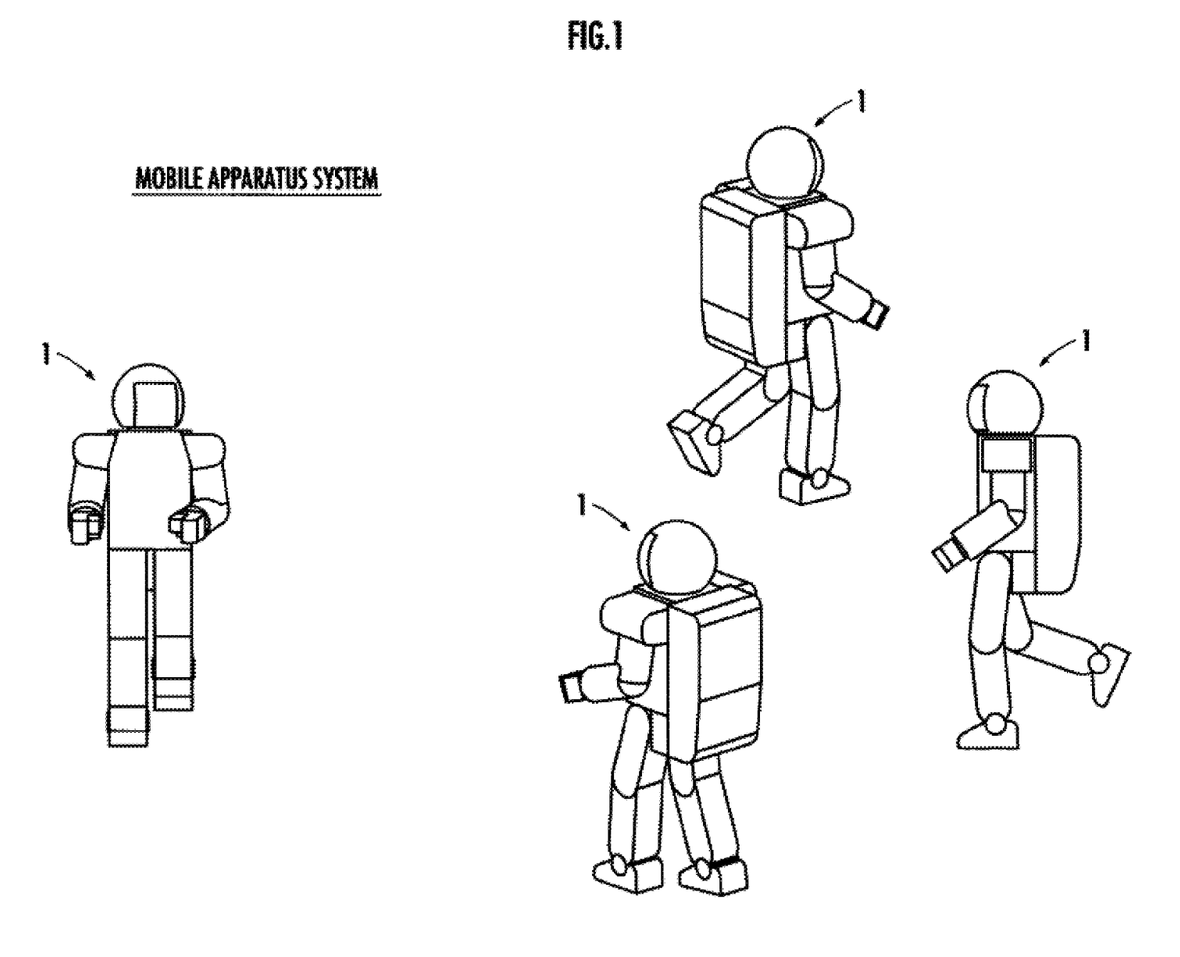
FIG. 1 illustrates the configuration of a mobile apparatus system of the present invention.

Embodiments of the mobile apparatus system of the present invention will now be described with reference to the drawings. The mobile apparatus system shown in FIG. 1 is made up of a plurality of robots 1. At least one robot 1 corresponds to a "first mobile apparatus", and at least one robot 1 other than the first mobile apparatus corresponds to a "second mobile apparatus". In the mobile apparatus system, under the condition that there always are the first and second mobile apparatuses, each robot 1 may function as the first mobile apparatus in a certain period while it may function as the second mobile apparatus in another period. Further, while the mobile apparatus system of the present invention is characterized in that the movement of each robot 1 is not managed by a server, the mobile apparatus system of the present invention is applicable, even if the movement of each robot 1 is managed by the server, in the situation where the robot 1 is out of the communication range of the server.

Figure 2:
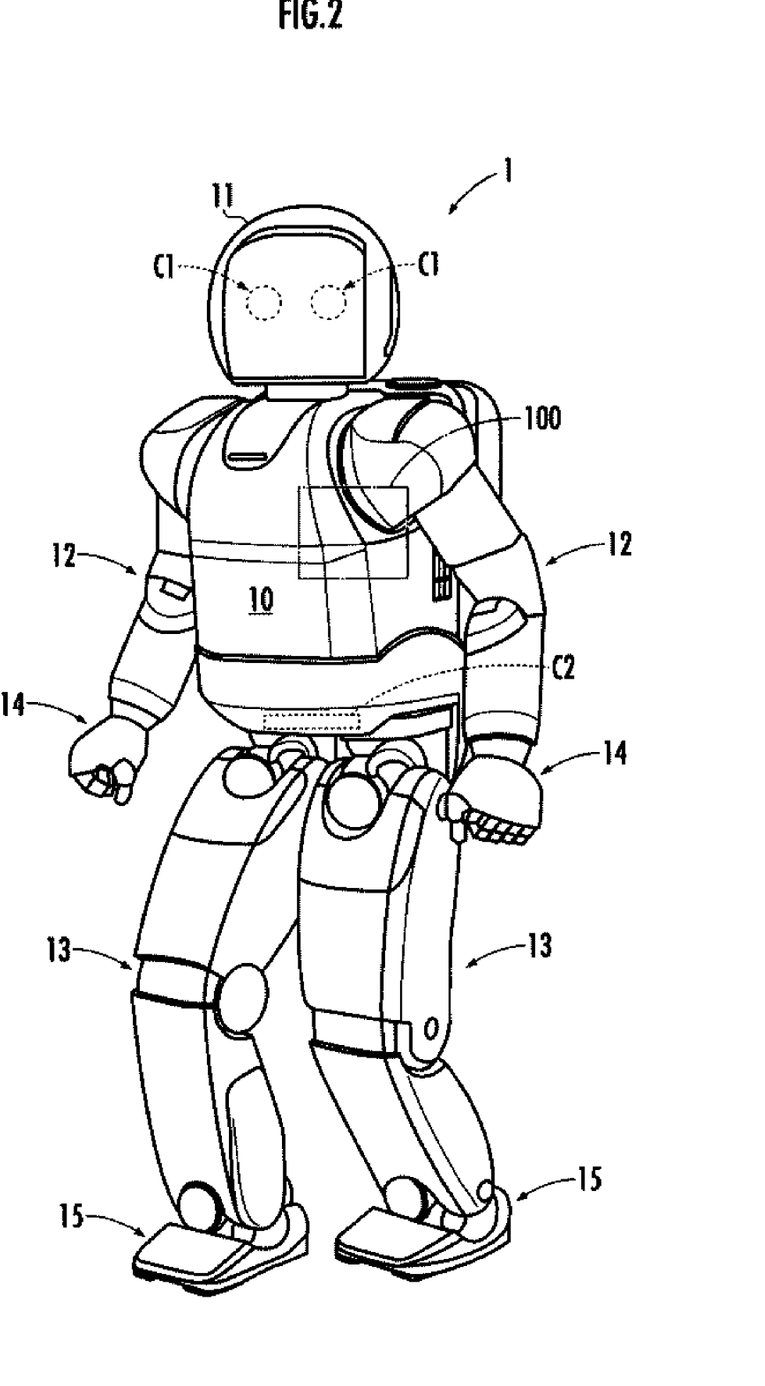
FIG. 2 illustrates the configuration of a robot as a mobile apparatus.

A robot 1 shown in FIG. 2 includes: a body 10, a head 11 provided on top of the body 10, left and right arms 12 extended from the respective sides of the body 10, a hand 14 provided at an end of each of the arms 12, left and right legs 13 extended downward from a lower part of the body 10, and a foot 15 provided at an end of each of the legs 13. The robot 1 is capable of bending and stretching the arms 12 and the legs 13 at a plurality of joint portions corresponding to the joints of a human being, such as shoulder, elbow, carpal, hip, knee, and ankle joints, by the forces transmitted from actuators 1000 (see FIG. 3), as disclosed in Japanese Re-Publications of PCT International Publications Nos. 03/090978 and 03/090979. The robot 1 can autonomously move with the left and right legs 13 (or the feet 15) repeatedly taking off and landing on the floor. The height of the head 11 may be adjusted through adjustment of the tilt angle of the body 10 with respect to the vertical direction. The head 11 is mounted with a pair of head cameras (CCD cameras) C1 arranged side by side to face forward of the robot 1. The body 10 is mounted with a waist camera (infrared camera) C2 in front at the lower part. It is noted that the mobile apparatus is not restricted to the robot 1 which autonomously moves with the movement of the legs 13, but may be a wheeled mobile robot (vehicle) or any other apparatus having the locomotive function.

The robot 1 includes: a control device 100 which is configured with an ECU or computer (consisting of CPU, ROM, RAM, I/O and others) serving as hardware; and a communication device 102. The computer has a memory having a control program (software) stored therein. While the control program may be installed to the computer via a software recording medium such as a CD or a DVD, it may be downloaded to the computer via a network or an artificial satellite by a server in response to a request signal transmitted from the robot 1 to the server.

Figure 3:
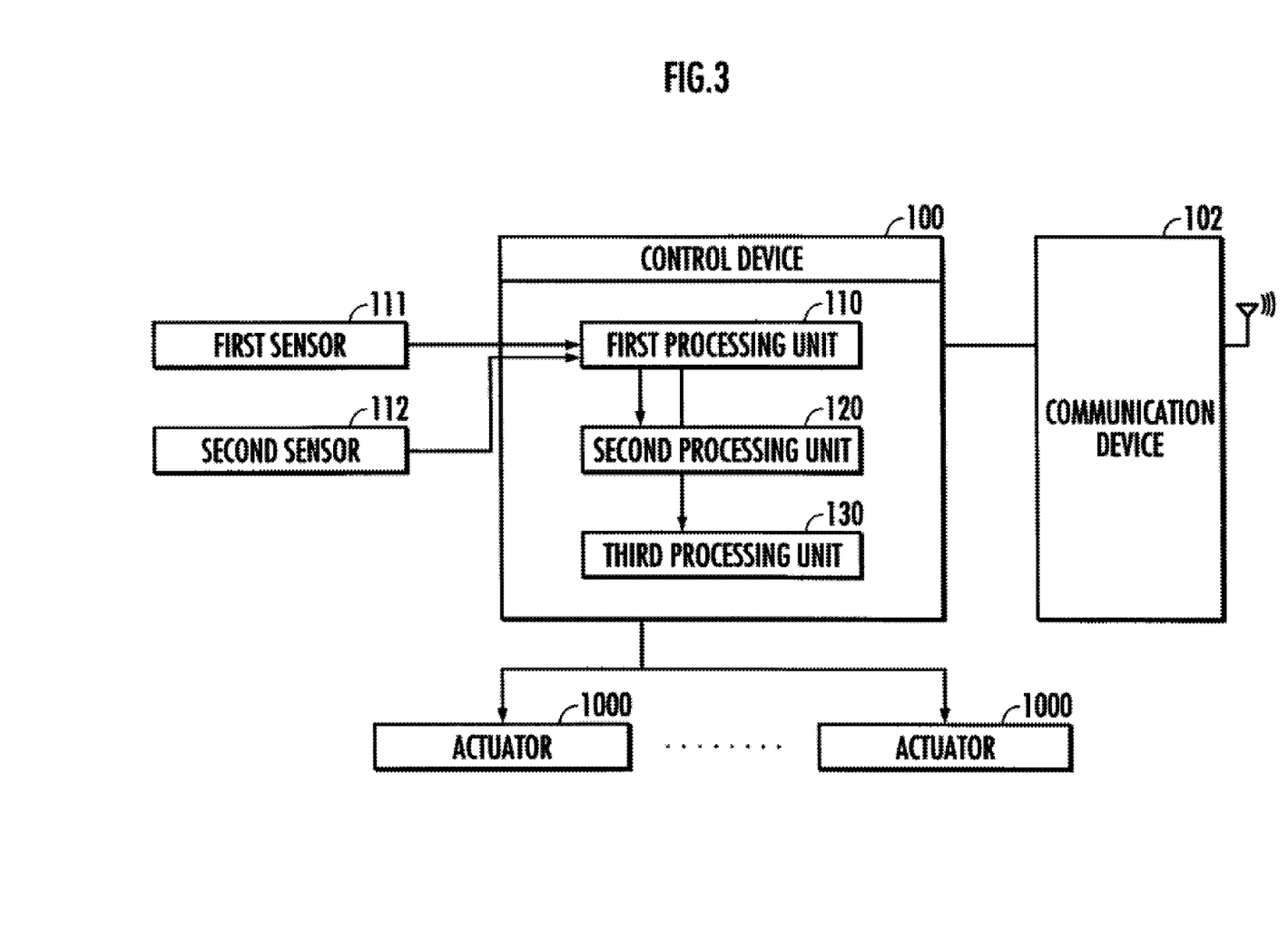
FIG. 3 illustrates a method of controlling the operation of the robot.

The control device 100 shown in FIG. 3 controls operations of the actuators 1000 based on the signals output from a first sensor 111 and a second sensor 112 to control the operations of the arms 12 and the legs 13. The first sensor 111 is for measuring the internal state or behavioral state of the robot 1. Various sensors mounted on the robot 1 correspond to the first sensor 111, which include a gyro sensor that outputs a signal responsive to the acceleration of the body 10, a rotary encoder that outputs a signal responsive to the joint angle of each joint, and a force sensor that outputs a signal responsive to the floor reaction force acting on the legs 13. The second sensor 112 is for measuring the external state or environment of the robot 1, including the behavioral state of an object. The head cameras C1 and the waist camera C2 correspond to the second sensor 112. The actuator 1000 includes a driving source such as an electric motor, a speed reducer provided between the output shaft of the driving source and a link constituting the arm 12 or the leg 13, and a flexible element such as an elastic member.

The control device 100 includes a first processing unit 110, a second processing unit 120, and a third processing unit 130. As used herein, that the component of the present invention "recognizes" the information means that the component performs every kind of information processing, such as searching a database for the information, reading the information from a storage device such as a memory, measuring, calculating, estimating, and determining the information based on the output signals of the sensors and the like, and storing the information obtained by measurement or the like in a memory, which is necessary for the information to be prepared or ready for further information processing.

The first processing unit 110 recognizes the region through which the robot 1 is passable as an element passing region QS in a two-dimensional model space. The first processing unit 110 recognizes the robot 1 and a trajectory representing the changes in position of the robot 1 as a first spatial element $Q_1$ and a first trajectory $p_1(t)$ representing the changes in a first position $p_1$, respectively, in the element passing region QS, based on the output signals from the first sensor 111 and the like. Further, the first processing unit 110 recognizes an object and a trajectory representing the changes in position of the object as a second spatial element $Q_2$ and a second trajectory $p_2(t)$ representing the changes in a second position $p_2$, respectively, in the element passing region QS, based on the output signals from the second sensor 112 and the like. The first processing unit 110 recognizes the second spatial element $Q_2$ expanded continuously or intermittently in accordance with the second trajectory $p_2(t)$ as an expanded second spatial element $EQ_2$. As used herein, the "spatial element" refers to the "point" for which its position, velocity, acceleration, and other states in the model space can be defined, the "line segment" for which its shape, length, and other states in addition to the position and the like in the model space can be defined, the "region" for which its shape, area, and other states in addition to the position and the like in the model space can be defined, and the like. It is noted that in the case where the robot 1 corresponds to the "second mobile apparatus", the first processing unit 110 recognizes a part or a whole of a target trajectory $R_0$ that the first mobile apparatus follows, based on a trajectory signal, which will be described later. Then, based on the recognition result, the first processing unit 110 recognizes the second trajectory $p_2(t)$.

The second processing unit 120 determines whether a "safety condition" specifying that the possibility of contact of the first spatial element $Q_1$ with the second spatial element $Q_2$ in the element passing region QS is low is satisfied, based on the recognition result (more accurately, a necessary part thereof) by the first processing unit 110. In the case where the robot 1 corresponds to the "first mobile apparatus", the second processing unit 120 further determines whether an "additional safety condition" is satisfied, which specifies that the object does not correspond to the second mobile apparatus such as another robot 1 other than the first mobile apparatus.

On the condition that the second processing unit 120 determines that the safety condition is not satisfied, the third processing unit 130 searches for a target trajectory $R_0$ allowing the first spatial element $Q_1$ to avoid contact with the expanded second spatial element $EQ_2$ in the element passing region QS, based on the recognition result by the first processing unit 110. In the case where the robot 1 corresponds to the "first mobile apparatus", when the second processing unit 120 determines that the additional safety condition is satisfied, the third processing unit 130 searches for a first target trajectory $R_1$ as the target trajectory $R_0$; while when the second processing unit 120 determines that the additional safety condition is not satisfied, the third processing unit 130 searches for a second target trajectory $R_2$ different from the first target trajectory $R_1$ as the target trajectory $R_0$.

The control device 100 controls the operation of the robot 1 such that it moves along a target trajectory $R_0$ which is defined in advance, or searched for and determined or set by the third processing unit 130, in the model space. In the case where the robot 1 corresponds to the "first mobile apparatus", the control device 100 transmits a trajectory signal representing a part or a whole of the target trajectory $R_0$ searched for and determined by the third processing unit 130 to a second mobile apparatus via the communication device 102. In the case where the robot 1 corresponds to the "second mobile apparatus", the control device 100 receives the trajectory signal via the communication device 102.

Figure 7:
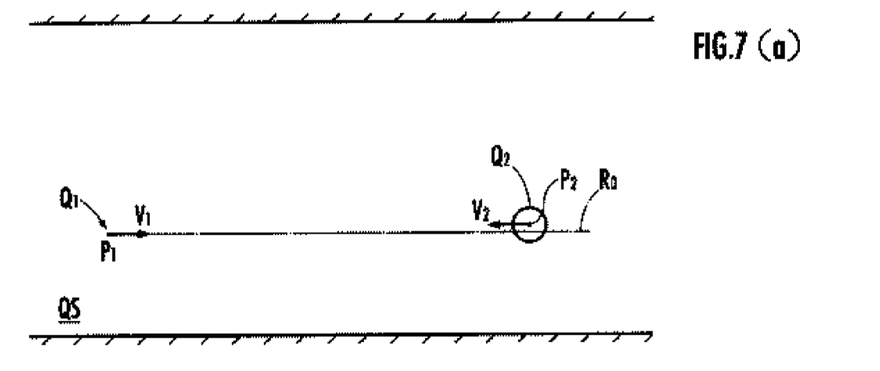
FIGS. 7 and 8 illustrate a method of searching for a target trajectory.

The functions of the mobile apparatus system made up of a plurality of robots 1 each having the above-described configuration will now be described. Firstly, the processing carried out by the control device 100 in the case where the robot 1 corresponds to the "second mobile apparatus" will be described. The first processing unit 110 reads from a memory, or accesses an external database to search for, a passable region of the robot 1 as a two-dimensional element passing region QS (S210 in FIG. 4). As a result, the element passing region QS of the shape as shown in FIG. 7(a), for example, is recognized. In the case where the second spatial element $Q_2$ is recognized as a Minkowski sum of a first region $q_1$ and a second region $q_2$ having the sizes corresponding to the sizes of the robot 1 and the object, respectively, as will be described later, the element passing region QS is recognized as a Minkowski difference between the region having the size corresponding to the size of the passable region and the first region $q_1$. While the element passing region QS may be defined as a flat or curved surface having an arbitrary point specified by the latitude and longitude, it may be changed sequentially based on the shapes of the surroundings of the robot 1 recognized based on the images obtained through the head cameras C1, including the tilt angle of the floor face, and presence/absence of steps or irregularities.

Figure 4:
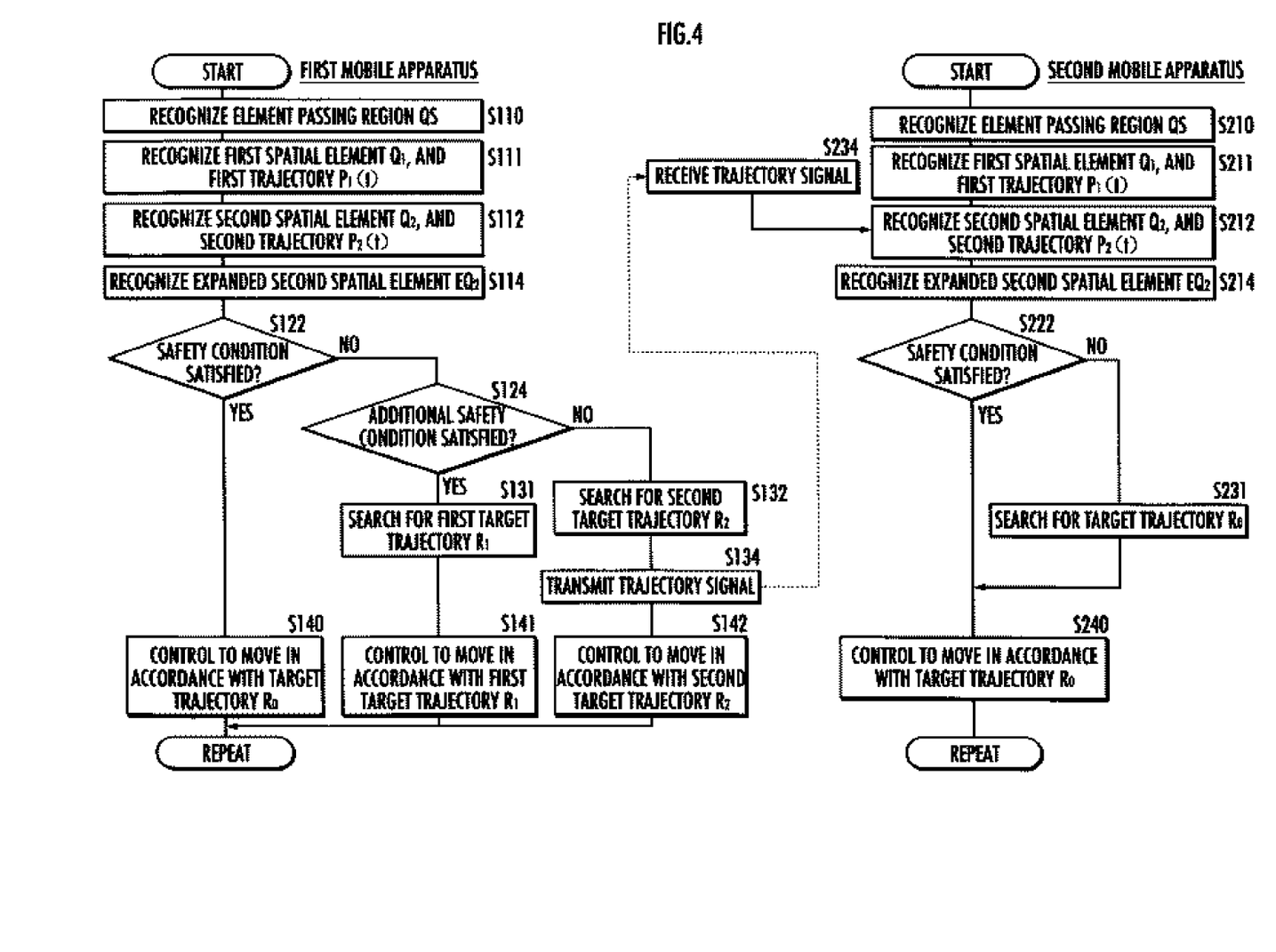
FIG. 4 illustrates the functions of the mobile apparatus system.
Figure 5:
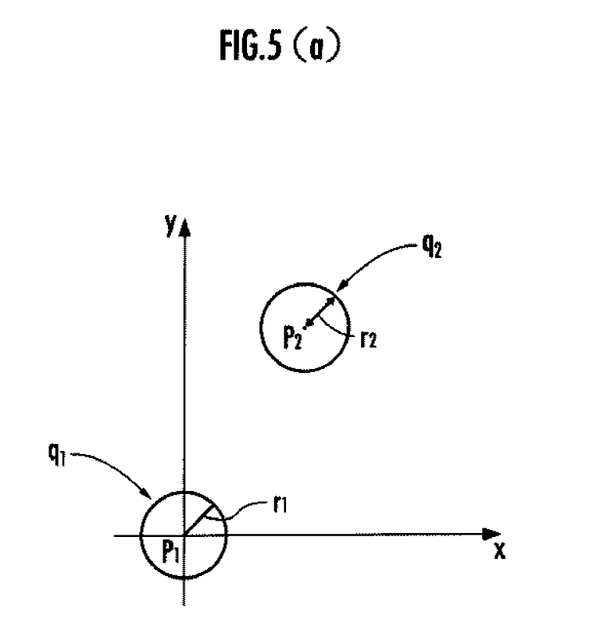
FIG. 5 illustrates recognition results of first and second spatial elements.

The first processing unit 110 recognizes the robot 1 and the trajectory representing the changes in its position as the first spatial element $Q_1$ and the first trajectory $p_1(t)$ representing the changes in the first position $p_1$, respectively, in the element passing region QS, based on the output signals from the first sensor 111 and the like (S211 in FIG. 4). The shape and size of the first spatial element $Q_1$ are read from a memory or a database. Although the first region $q_1$ shown in FIG. 5(a) having the size corresponding to the size of the robot 1 may be recognized as the first spatial element $Q_1$ without modification, in the present embodiment, the first region $q_1$ reduced into a point as shown in FIG. 5(b) is recognized as the first spatial element $Q_1$. This can reduce the amount of operations required to search for the trajectory which the robot 1 should follow. In the case where an object such as a box held in the arms 12 of the robot 1 or a device optionally attached to the body 10 to add a function to the robot 1 moves with the robot 1 in an integrated manner, the shapes and sizes of the robot 1 and the object which move in a piece may collectively be recognized as the shape and size of the robot 1. The position of the robot 1 is measured based on the signals representing the latitude and longitude (or coordinates in a fixed system of coordinates) obtained through its GPS function, the signals representing the acceleration of the robot 1 which are output sequentially from a gyro sensor, or the signals representing the joint angles of the legs 13 and others which are output from a rotary encoder, using an inverse dynamic model as required. The velocity (first velocity) $v_1$ of the first spatial element $Q_1$, and its acceleration (first acceleration) $\alpha_1$ when necessary, may be calculated based on the first trajectory $p_1(t)$.

The first processing unit 110 recognizes the object and the trajectory representing the changes in its position as the second spatial element $Q_2$ and the second trajectory $p_2(t)$ representing the changes in the second position $p_2$, respectively, in the element passing region QS, based on the output signals from the second sensor 112 and the like (S212 in FIG. 4). The shape and size of the second spatial element $Q_2$ may be recognized, after the type of the object is determined based on the images of the object picked up by the head cameras C1, by searching a memory (storing a table showing correspondences between the types, shapes, and sizes of objects) based on the determined result. Although the second region $q_2$ shown in FIG. 5(a) having the size corresponding to that of the object may be recognized as the second spatial element $Q_2$ without modification, in the present embodiment, the Minkowski sum of the first and second regions $q_1$ and $q_2$ as shown in FIG. 5(b) is recognized as the second spatial element $Q_2$. The position of the object may be measured based on the images of the object picked up by the head cameras C1 and the waist camera C2. The velocity (second velocity) $v_2$ of the second spatial element $Q_2$, and its acceleration (second acceleration) $\alpha_2$ when necessary, may be calculated based on the second trajectory $p_2(t)$.

Figure 6:
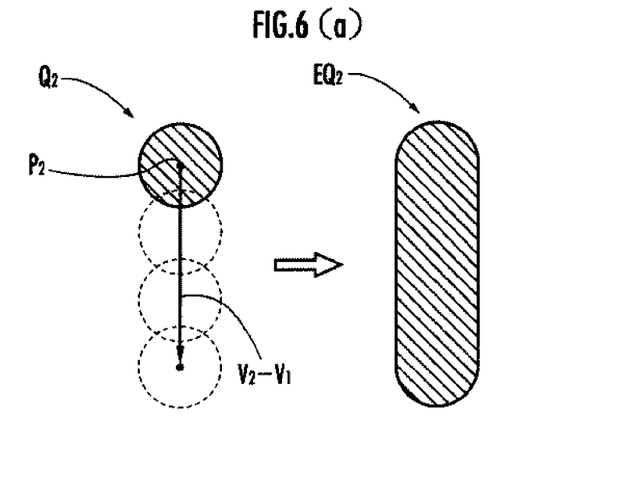
FIG. 6 illustrates recognition results of an expanded second spatial element.

The first processing unit 110 recognizes the second spatial element $Q_2$ continuously or intermittently expanded in accordance with the changes in the second position $p_2$ as an expanded second spatial element $EQ_2$ (S214 in FIG. 4). For example, the second spatial element $Q_2$ continuously enlarged in the direction of the second velocity vector $v_2$ is recognized as a straight band-shaped expanded second spatial element $EQ_2$, as shown in FIG. 6(a) on the right side. The variable k representing the degree of enlargement of the second spatial element $Q_2$ is expressed by the following expression (1), based on the first position vector $p_1$, the second position vector $p_2$, the first velocity vector $v_1$, and the second velocity vector $v_2$.

$$k=|p_2-p_1||v_2|/|v_2-v_1| \qquad (1)$$

In the case where the control device 100 receives, from the robot (first mobile apparatus) 1 regarded as the object, the trajectory signal representing a part or a whole of the target trajectory $R_0$ (specifically, a second target trajectory $R_2$ as will be described later) of the first mobile apparatus that has been searched for and determined therein via the communication device 102 (S234 in FIG. 4), a second trajectory $p_2(t)$ defining the second velocity vector $v_2$ is recognized based on that target trajectory $R_0$, and an expanded second spatial element $EQ_2$ is recognized as well (S212 and S214 in FIG. 4).

Further, the second spatial element $Q_2$ continuously enlarged so as to turn around in accordance with the second velocity vector $v_2$ or the second acceleration vector $\alpha_2$ is recognized as a bent band-shaped expanded second spatial element $EQ_2$, as shown in FIG. 6(b) on the right side. It is noted that the second spatial element $Q_2$ intermittently enlarged in the direction in accordance with the second velocity vector $v_2$ may be recognized as the expanded second spatial element $EQ_2$ made up of a plurality of spatial elements as shown in FIG. 6(c) on the right side. The expanded second spatial element $EQ_2$ is used for the search of target trajectories by the third processing unit 130, as will be described later, and therefore, it may be recognized only occasionally when required by the trajectory search and the like.

The second processing unit 120 determines whether the safety condition specifying that the possibility of contact of the first spatial element $Q_1$ with the second spatial element $Q_2$ in the element passing region QS is low is satisfied, based on the recognition result by the first processing unit 110 (more accurately, a necessary part thereof; the same applies hereinafter) (S222 in FIG. 4). Specifically, the safety condition is set such that the target trajectory $R_0$ of the first spatial element $Q_1$ defined in the element passing region QS does not intersect or contact the second spatial element $Q_2$. For example in the situation shown in FIG. 7(a), the target trajectory $R_0$ of the first spatial element $Q_1$ intersects the second spatial element $Q_2$, and accordingly, it is determined that the safety condition is not satisfied.

If the second processing unit 120 determines that the safety condition is satisfied (YES in S222 in FIG. 4), the control device 100 controls the operation of the robot 1 such that it moves along the latest target trajectory $R_0$, without modifying it (S240 in FIG. 4). On the condition that the second processing unit 120 determines that the safety condition is not satisfied (NO in S222 in FIG. 4), the third processing unit 130 searches for a trajectory which allows the first spatial element $Q_1$ to avoid contact with the expanded second spatial element $EQ_2$ in the element passing region QS as a new target trajectory $R_0$, based on the recognition result by the first processing unit 110 (S231 in FIG. 4). As a result, the trajectory allowing the first spatial element $Q_1$ to avoid contact with the expanded second spatial element $EQ_2$, as shown in FIG. 7(b), is determined as the target trajectory $R_0$. The control device 100 then controls the operation of the robot 1 such that it moves along the target trajectory $R_0$ searched for and determined by the third processing unit 130 (S240 in FIG. 4).

Hereinafter, the processing carried out by the control device 100 in the case where the robot 1 corresponds to the "first mobile apparatus" will be described. The processing common in content with the processing in the case where the robot 1 corresponds to the second mobile apparatus will be described only in brief. The first processing unit 110 recognizes the element passing region QS (S110 in FIG. 4). The first processing unit 110 recognizes the first spatial element $Q_1$ and the first trajectory $p_1(t)$ in the element passing region QS, based on the output signals from the first sensor 111 and the like (S111 in FIG. 4). The first processing unit 110 recognizes the second spatial element $Q_2$ and the second trajectory $p_2(t)$ in the element passing region QS, based on the output signals from the second sensor 112 and the like (S112 in FIG. 4). The first processing unit 110 recognizes the second spatial element $Q_2$ continuously or intermittently expanded in accordance with the second trajectory $p_2(t)$ as the expanded second spatial element $EQ_2$ (S114 in FIG. 4).

The second processing unit 120 determines whether the above-described safety condition is satisfied, based on the recognition result by the first processing unit 110 (S122 in FIG. 4). In the case where the second processing unit 120 determines that the safety condition is satisfied (YES in S122 in FIG. 4), the control device 100 controls the operation of the robot 1 such that it moves along the latest target trajectory $R_0$, without modifying it (S140 in FIG. 4). On the condition that the second processing unit 120 determines that the safety condition is not satisfied (NO in S122 in FIG. 4), the second processing unit 120 determines whether the "additional safety condition" that the object does not correspond to the robot (second mobile apparatus) 1 is satisfied (S124 in FIG. 4). Whether the additional safety condition is satisfied or not may be determined: according to the pattern matching of the images of the object picked up by the head cameras C1 mounted on the robot 1 functioning as the first mobile apparatus; according to whether a predetermined sign such as emission of light from the object is detected by the second sensor 112 mounted on the robot 1 functioning as the first mobile apparatus; or according to whether a predetermined response signal is received from the object in response to the signal transmitted from the robot 1 functioning as the first mobile apparatus. Such a determination as to whether the additional safety condition is satisfied is made taking into account that, if the object corresponds to the second mobile apparatus, it would be inferior in capability of flexibly changing its trajectory compared to the case where the object corresponds to an animal such as a human being. Further, the determination result as to whether the additional safety condition is satisfied is used to avoid the undesirable situation where the first and second mobile apparatuses have their target trajectories $R_0$ crossing each other, as shown in FIG. 7(c) for example, and the probability of contact of the mobile apparatuses with each other would rather increase if they both move along the target trajectories $R_0$.

On the condition that the second processing unit 120 determines that the additional safety condition is satisfied (YES in S124 in FIG. 4), the third processing unit 130 searches for a first target trajectory R1 allowing the first spatial element $Q_1$ to avoid contact with the expanded second spatial element $EQ_2$ in the element passing region QS as the target trajectory $R_0$, based on the recognition result by the first processing unit 110 (S131 in FIG. 4). The search algorithm of the first target trajectory $R_1$ as the target trajectory $R_0$ in the first mobile apparatus is identical or similar to the search algorithm of the target trajectory $R_0$ in the second mobile apparatus, which is for example to search for the route preferentially in a wider area in the element passing region QS (see S131 and S231 in FIG. 4). Then, the control device 100 controls the operation of the robot 1 such that it moves along the first target trajectory $R_1$ determined as the target trajectory $R_0$ (S141 in FIG. 4).

On the condition that the second processing unit 120 determines that the additional safety condition is not satisfied (NO in S124 in FIG. 4), the third processing unit 130 searches for a second target trajectory $R_2$ which is different from the first target trajectory $R_1$ as the target trajectory $R_0$, based on the recognition result by the first processing unit 110 when necessary (S132 in FIG. 4). As a result, for example, the second target trajectory $R_2$ is searched for such that the velocity of the first spatial element $Q_1$ following the second target trajectory $R_2$ becomes 0 or lower than the velocity of the first spatial element $Q_1$ following the first target trajectory $R_1$. Further, the second target trajectory $R_2$ is searched for such that the second target trajectory $R_2$ is on an opposite side of the expanded second spatial element $EQ_2$ from the first target trajectory $R_1$ in the element passing region QS (see FIG. 8(b)).

The control device 100 transmits a trajectory signal representing a part or a whole of the second target trajectory $R_2$ searched for and determined by the third processing unit 130 via the communication device 102 (S134 in FIG. 4). The control device 100 then controls the operation of the robot 1 such that it moves along the second target trajectory $R_2$ determined as the target trajectory $R_0$ (S142 in FIG. 4).

According to the mobile apparatus system exerting the above-described functions, in the case where the safety condition is not satisfied in the robot 1 which corresponds to either the first mobile apparatus or the second mobile apparatus, i.e., in the case where the robot 1 functioning as the mobile apparatus is highly likely to contact an object, the target trajectory $R_0$ allowing the first spatial element $Q_1$ to avoid contact with the expanded second spatial element $EQ_2$ in the model space is searched for and determined, and with the mobile apparatus autonomously moving along this target trajectory $R_0$, the contact between the mobile apparatus and the object is avoided (see S122, S131, S222, and S231, and FIG. 7(a) and (b)).

Figure 8:
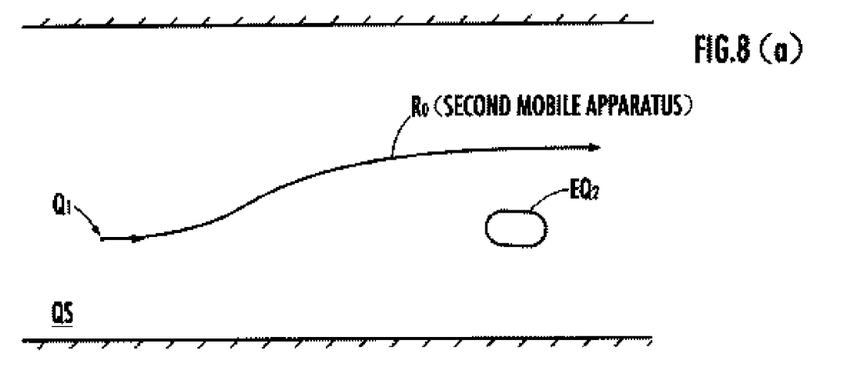

Further, a part or a whole of the target trajectory $R_0$ of the robot 1 functioning as the first mobile apparatus is recognized by the robot 1 functioning as the second mobile apparatus (see S134 and S234 in FIG. 4). Then, in the second mobile apparatus, based on this recognition result, the trajectory of the first mobile apparatus regarded as the object is recognized as the second trajectory $p_2(t)$, and the expanded second spatial element $EQ_2$ is recognized based on the second trajectory $p_2(t)$ (S212 and S214 in FIG. 4). For example, assume the following case: in the first mobile apparatus, the second target trajectory $R_2$ is searched for and determined such that the velocity of the first spatial element $Q_1$ becomes 0 or lower than the velocity of the first spatial element $Q_1$ following the first target trajectory $R_1$; and in the second mobile apparatus, a part or a whole of the second target trajectory $R_2$ of the first mobile apparatus regarded as the object is recognized. In this case, because the first mobile apparatus stops or moves at a velocity lower than usual, the second mobile apparatus recognizes that the second velocity $v_2$ is small, and thus, it recognizes the expanded second spatial element $EQ_2$ having a size smaller than usual, as shown in FIG. 8(a) (see the expression (1) and FIG. 7(b)). Then, in the second mobile apparatus, the target trajectory $R_0$ of the first spatial element $Q_1$, corresponding to the second mobile apparatus, is searched for and determined to avoid contact with the expanded second spatial element $EQ_2$, and the second mobile apparatus moves in accordance with this target trajectory $R_0$ (see S231 and S240 in FIG. 4, and FIG. 8(a)). Next, assume the following case: in the first mobile apparatus, the second target trajectory $R_2$ is searched for and determined such that it is on an opposite side from the first target trajectory $R_1$ with respect to the expanded second spatial element $EQ_2$ corresponding to the second mobile apparatus regarded as the object, as shown in FIG. 8(b); and in the second mobile apparatus, a part or a whole of the second target trajectory $R_2$ of the first mobile apparatus regarded as the object is recognized. In this case, because the first mobile apparatus moves along the second target trajectory $R_2$ determined as the target trajectory $R_0$, in the second mobile apparatus, the second velocity $v_2$ in the direction along the second target trajectory $R_2$ is recognized, and the expanded second spatial element $EQ_2$ extending along the second target trajectory $R_2$ is recognized (see the expression (1) and FIG. 8(b)). Then, in the second mobile apparatus, the target trajectory $R_0$ of the first spatial element $Q_1$, corresponding to the second mobile apparatus, allowing the first spatial element $Q_1$ to avoid contact with the expanded second spatial element $EQ_2$ is searched for and determined, and the second mobile apparatus moves along this target trajectory $R_0$ (see S231 and S240 in FIG. 4, and FIG. 8(b)).

As such, in the robot 1 functioning as the second mobile apparatus, the target trajectory $R_0$ allowing the first spatial element $Q_1$ to avoid contact with the extended second spatial element $EQ_2$ is searched for and determined, as described above, and the second mobile apparatus autonomously moves along the target trajectory $R_0$, whereby the contact between the first and second mobile apparatuses is avoided (see S231 and S240 in FIG. 4).

Furthermore, in the robot 1 functioning as the first mobile apparatus, the first target trajectory $R_1$, which is searched for in the case where it is determined that the "additional safety condition" specifying that the object does not correspond to the second mobile apparatus is satisfied, and the second target trajectory $R_2$, which is searched for in the case where it is determined that the additional safety condition is not satisfied, are differentiated from each other (see S124, S131, and S132, and FIG. 8(b)). Therefore, in the case where the object corresponds to the second mobile apparatus, the first mobile apparatus autonomously moves along the target trajectory $R_0$ which is different from the one in the case where the object does not correspond to the second mobile apparatus. Accordingly, it is possible to prevent the undesirable situation that, because the first and second mobile apparatuses are identical or similar in algorithm for searching for the target trajectories $R_0$, the possibility of contact therebetween would not lower, or rather increase, when they move along the target trajectories for the purposes of avoiding the contact (see FIG. 7(c)). Furthermore, it is possible to cause the second mobile apparatus to recognize a part or a whole of the target trajectory $R_0$ of the first mobile apparatus. This allows the second mobile apparatus to recognize the trajectory of the first mobile apparatus regarded as the object, and further to recognize the expanded second spatial element $EQ_2$ based on that recognition result. Accordingly, in the second mobile apparatus, the target trajectory $R_0$ for the first spatial element $Q_1$ to avoid contact with the expanded second spatial element $EQ_2$ is searched for and determined, and with the second mobile apparatus autonomously moving along this target trajectory $R_0$, the contact between the first and second mobile apparatuses is prevented.

Figure 9:
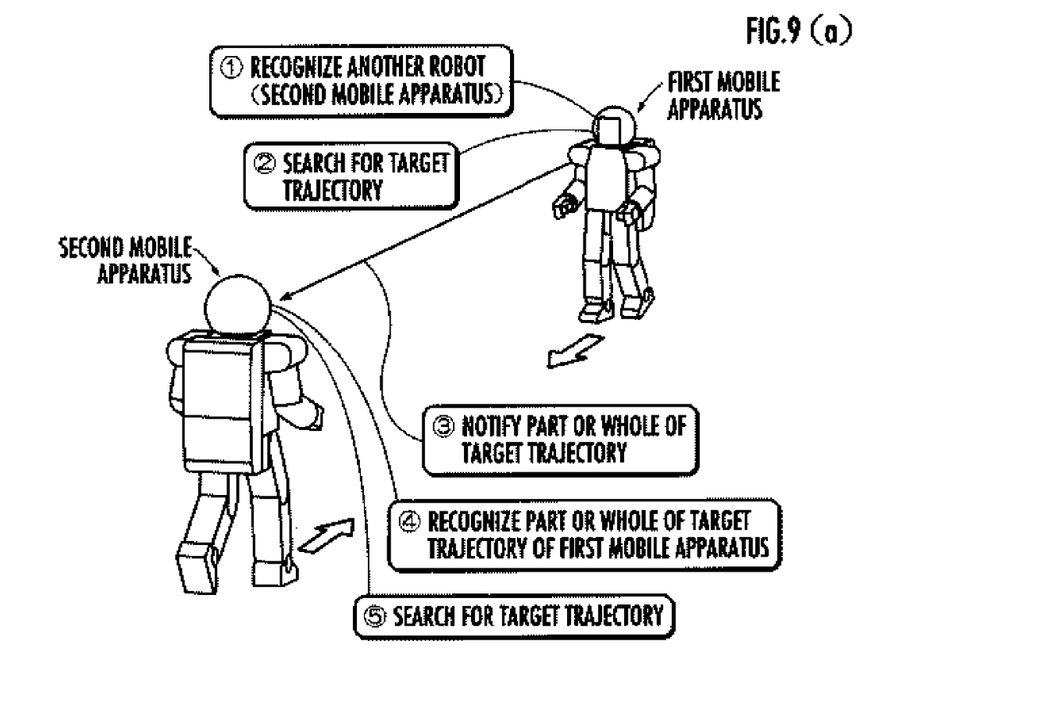
FIG. 9 illustrates how the robots behave.

As described above, the robots 1 as the mobile apparatuses are capable of moving or acting autonomously, while avoiding contact with each other, in the environment where the movements of the robots 1 are not managed by a server. Now, assume the situation as shown in FIG. 9(a) where two robots 1 serving as the first and second mobile apparatuses, respectively, are moving facing each other. In this case, as described above, in the first mobile apparatus, (i) it is recognized that the object corresponds to the second mobile apparatus, and (ii) based on this recognition result, a target trajectory $R_0$ (=second target trajectory $R_2$) is searched for and determined. Further, (iii) the first mobile apparatus causes the second mobile apparatus to recognize a part or a whole of the target trajectory $R_0$. In the second mobile apparatus, (iv) the part or the whole of the target trajectory $R_0$ of the first mobile apparatus is recognized, and (v) based on this recognition result, the target trajectory $R_0$ which the second mobile apparatus should follow is searched for and determined. This allows the mobile apparatuses to move in accordance with their respective target trajectories $R_0$ to avoid contact with each other, as shown in FIG. 9(b).

It is noted that the "mobile apparatus" constituting the mobile apparatus system may be a robot different in configuration from the robot 1 in the above embodiment, an automated guided vehicle, or any other apparatuses having the autonomously moving function. Further, mobile apparatuses of different kinds may constitute the mobile apparatus system.

The above embodiment has been configured such that the control device 100 in the first mobile apparatus transmits a trajectory signal via the communication device 102, and the control device 100 in the second mobile apparatus receives the trajectory signal via the communication device, to recognize a part or a whole of the target trajectory of the first mobile apparatus based on the received trajectory signal. Alternatively, it may be configured as follows: in the first mobile apparatus, the control device 100 controls the operation of the first mobile apparatus so as to cause an LED lamp mounted thereon to blink in a predetermined manner, or to cause the robot 1 functioning as the first mobile apparatus to move in a predetermined manner, for example such that the head 11 and the arms 12 of the robot 1 face the direction in which the robot 1 is about to move, which is determined by the target trajectory $R_0$, and in the robot 1 functioning as the second mobile apparatus, the control device 100 recognizes the operation of the first mobile apparatus through the second sensor 112 including the head cameras C1, to thereby recognize a part or a whole of the target trajectory $R_0$ of the first mobile apparatus based on the recognition result.

In the above embodiment, the robot 1 functioning as the first mobile apparatus transmits the trajectory signal on the condition that it is determined that both of the safety condition and the additional safety condition are not satisfied (see S122, S124, and S134 in FIG. 4). Alternatively, the first mobile apparatus may transmit the trajectory signal in the case where it is determined that one of the safety condition and the additional second condition is not satisfied, so that the trajectory signal is received by the second mobile apparatus. Still alternatively, the first mobile apparatus may transmit the trajectory signal at regular intervals, irrespective of whether the safety condition and the additional safety condition are satisfied or not, so that the trajectory signal is received by any second mobile apparatuses present near the first mobile apparatus.

In the above embodiment, in the first mobile apparatus, the second target trajectory $R_2$ different from the first target trajectory $R_1$ is searched for as the target trajectory $R_0$ in accordance with the determination result about fulfillment of the additional safety condition, and a part or a whole of the second target trajectory $R_2$ is recognized in the second mobile apparatus (see S124, S132, S134, and S234 in FIG. 4, and FIG. 8(b)). Alternatively, it may be configured such that, in the first mobile apparatus, the first target trajectory $R_1$ is searched for as the target trajectory $R_0$ in the case where the safety condition is not satisfied, which is followed by the determination about fulfillment of the additional safety condition, and in the case where it is determined that the additional safety condition is not satisfied, a part or a whole of that target trajectory $R_0$ is recognized by the second mobile apparatus. In this case, the first mobile apparatus moves along the first target trajectory $R_1$ determined as the target trajectory $R_0$ as shown in FIG. 8(c), and thus, in the second mobile apparatus, the second velocity $v_2$ in the direction along the first target trajectory $R_1$ is recognized, and the expanded second spatial element $EQ_2$ extending along the first target trajectory $R_1$ is recognized (see the expression (1) and FIG. 8(c)). Then, in the second mobile apparatus, the target trajectory $R_0$ for the first spatial element $Q_1$, corresponding to the second mobile apparatus, to avoid contact with the expanded second spatial element $EQ_2$ is searched for and determined, and the second mobile apparatus moves along this target trajectory $R_0$ (see S231 and S240 in FIG. 4, and FIG. 8(c)). As a result, as in the above-described embodiment, the robots 1 functioning as the mobile apparatuses are capable of moving or acting autonomously, while preventing contact with each other, in the environment where the movements of the robots 1 are not managed by a server (see FIG. 9(a) and (b)).

What is claimed is:

1. A mobile apparatus system made up of a first mobile apparatus and a second mobile apparatus each comprising a control device and having an operation controlled by the control device to autonomously move along a target trajectory representing changes in a target position defined in a two-dimensional model space, the control device including a first processing unit, a second processing unit, and a third processing unit, wherein in the i-th mobile apparatus (i=1, 2), the first processing unit recognizes the i-th mobile apparatus and a trajectory representing changes in position of the i-th mobile apparatus as a first spatial element and a first trajectory representing changes in a first position, respectively, in the model space, recognizes an object and a trajectory representing changes in position of the object as a second spatial element and a second trajectory representing changes in a second position, respectively, and recognizes the second spatial element continuously or intermittently expanded in accordance with the second trajectory as an expanded second spatial element, the second processing unit determines whether a safety condition is satisfied based on a recognition result by the first processing unit, the safety condition specifying that a possibility of contact between the first spatial element and the second spatial element is low, and on a condition that the second processing unit determines that the safety condition is not satisfied, the third processing unit searches for the target trajectory based on the recognition result by the first processing unit, the target trajectory allowing the first spatial element to avoid contact with the expanded second spatial element, in the first mobile apparatus, the control device causes the second mobile apparatus to recognize a part or a whole of the target trajectory searched for and determined by the third processing unit, and in the second mobile apparatus, the control device recognizes the part or the whole of the target trajectory of the first mobile apparatus, and based on this recognition result, the first processing unit recognizes the trajectory of the first mobile apparatus as the second trajectory, with the first mobile apparatus regarded as the object.

2. The mobile apparatus system according to claim 1, wherein in the first mobile apparatus,
the second processing unit determines whether an additional safety condition is satisfied, the additional safety condition specifying that the object does not correspond to the second mobile apparatus, and
in the case where the second processing unit determines that the additional safety condition is satisfied, the third processing unit searches for a first target trajectory as the target trajectory, whereas in a case where the second processing unit determines that the additional safety condition is not satisfied, the third processing unit searches for a second target trajectory different from the first target trajectory as the target trajectory.

3. The mobile apparatus system according to claim 2, wherein in the first mobile apparatus, the third processing unit searches for the second target trajectory such that the first spatial element following the second target trajectory has a velocity of 0 or lower than a velocity of the first spatial element following the first target trajectory.

4. The mobile apparatus system according to claim 2, wherein in the first mobile apparatus, the third processing unit searches for the second target trajectory such that the second target trajectory is on an opposite side of the expanded second spatial element from the first target trajectory in an element passing region.

5. The mobile apparatus system according to claim 2, wherein in the first mobile apparatus, in the case where the second processing unit determines that the additional safety condition is not satisfied, the control device causes the second mobile apparatus to recognize a part or a whole of the target trajectory searched for and determined by the third processing unit.

6. The mobile apparatus system according to claim 1, wherein
in the first mobile apparatus, the control device transmits a trajectory signal representing a part or a whole of the target trajectory to the second mobile apparatus, and
in the second mobile apparatus, the control device receives the trajectory signal to recognize the part or the whole of the target trajectory.

7. The mobile apparatus system according to claim 1, wherein
in the first mobile apparatus, the control device controls the operation of the first mobile apparatus to express a part or a whole of the target trajectory, and
in the second mobile apparatus, the control device recognizes the operation of the first mobile apparatus to recognize the part or the whole of the target trajectory expressed by the operation.

8. A first mobile apparatus comprising a control device and having an operation controlled by the control device to autonomously move along a target trajectory representing changes in a target position defined in a two-dimensional model space,
the control device including a first processing unit, a second processing unit, and a third processing unit, wherein
the first processing unit recognizes a region through which the first mobile apparatus is capable of passing as an element passing region in the model space, recognizes the first mobile apparatus and a trajectory representing changes in position of the first mobile apparatus as a first spatial element and a first trajectory representing changes in a first position, respectively, in the model space, recognizes an object and a trajectory representing changes in position of the object as a second spatial element and a second trajectory representing changes in a second position, respectively, and recognizes the second spatial element continuously or intermittently expanded in accordance with the second trajectory as an expanded second spatial element,
the second processing unit determines whether a safety condition is satisfied based on a recognition result by the first processing unit, the safety condition specifying that a possibility of contact between the first spatial element and the second spatial element is low,
on a condition that the second processing unit determines that the safety condition is not satisfied, the third processing unit searches for the target trajectory based on the recognition result by the first processing unit, the target trajectory allowing the first spatial element to avoid contact with the expanded second spatial element, and
the control device causes a second mobile apparatus different from the first mobile apparatus to recognize a part or a whole of the target trajectory searched for and determined by the third processing unit.

9. A second mobile apparatus comprising a control device and having an operation controlled by the control device to autonomously move along a target trajectory representing changes in a target position defined in a two-dimensional model space,
the control device including a first processing unit, a second processing unit, and a third processing unit, wherein
the first processing unit recognizes a region through which the second mobile apparatus is capable of passing as an element passing region in the model space, recognizes the second mobile apparatus and a trajectory representing changes in position of the second mobile apparatus as a first spatial element and a first trajectory representing changes in a first position, respectively, in the model space, recognizes an object and a trajectory representing changes in position of the object as a second spatial element and a second trajectory representing changes in a second position, respectively, and recognizes the second spatial element continuously or intermittently expanded in accordance with the second trajectory as an expanded second spatial element,
the second processing unit determines whether a safety condition is satisfied based on a recognition result by the first processing unit, the safety condition specifying that a possibility of contact between the first spatial element and the second spatial element is low,
on a condition that the second processing unit determines that the safety condition is not satisfied, the third processing unit searches for the target trajectory based on the recognition result by the first processing unit, the target trajectory allowing the first spatial element to avoid contact with the expanded second spatial element, and
the control device recognizes a part or a whole of a target trajectory of a first mobile apparatus different from the second mobile apparatus, and based on this recognition result, the first processing unit recognizes the trajectory of the first mobile apparatus as the second trajectory, with the first mobile apparatus regarded as the object.

* * * * *